Aug. 20, 1935.   J. F. THOMPSON   2,012,113
COMBINED CONTAINER AND DRINKING VESSEL
Filed July 18, 1933

Inventor
Julian F. Thompson
By Samuel Herrick
Attorney

Patented Aug. 20, 1935

2,012,113

UNITED STATES PATENT OFFICE 2,012,113

COMBINED CONTAINER AND DRINKING VESSEL

Julian F. Thompson, Bridgeport, Conn.

Application July 18, 1933, Serial No. 681,034

3 Claims. (Cl. 65—13)

This invention relates to a combined container and drinking vessel.

It is common practice in lunch rooms, roadside refreshment stands, and the like, to serve milk in the bottles in which they are delivered to the lunch room from the dairy. It is difficult to drink from the bottles as at present constructed, while upon the other hand it involves considerable expense to furnish drinking glasses to the purchasers of the milk. Further, many people buy milk from roadside refreshment stands who do not intend to drink the milk at the stand, but who wish to carry it along with them and consume it at some other point. This applies particularly to tourists, campers, picnic parties, and the like.

It is a primary object of the present invention to provide a combined drinking vessel and container with all the advantages of the conventional milk bottle as to cleanliness and sanitation, while being constructed in such manner that the purchaser may drink the milk therefrom with as much ease as when drinking it from a glass.

It is a further object of the invention to provide a container so shaped and dimensioned that it may advantageously be used as an ordinary drinking glass after the original contents have been consumed therefrom.

It is likewise an object of the invention to provide a container of this sort so constructed as to readily lend itself to rapidity (and consequent economy) of manufacture.

I preferably provide a container of substantially pint capacity and of the character of that illustrated in the accompanying drawing wherein.

Figure 1:
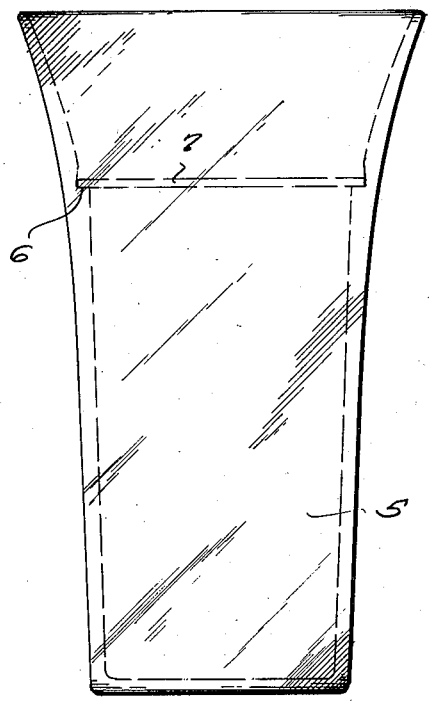
Figure 1 is a side elevation of the container.
Figure 2:
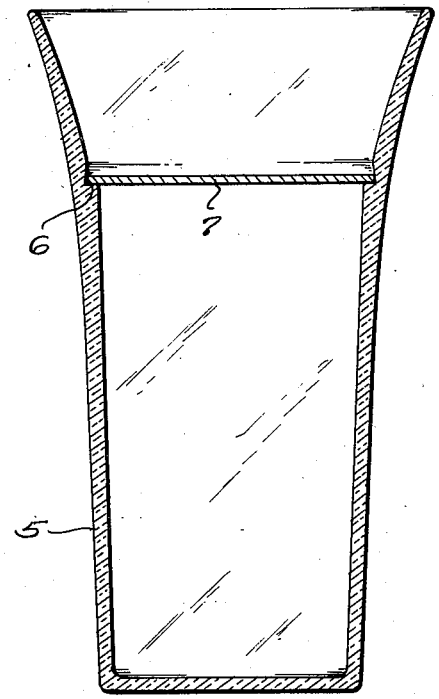
Figure 2 is a vertical sectional view therethrough.

The device of the present invention comprises a receptacle 5 shaped much like a tall drinking glass and having a circumferentially continuous ledge 6 therein upon which a paper cap 7, much like those used in milk bottles, is adapted to rest. The walls of the glass immediately above the ledge 6 are preferably, though not necessarily slightly convergent to aid in the retention of cap 7. The receptacle 5 may be made of glass, or any other suitable material. Beetleware is one material which may be used, if desired. This material is very tough and is highly adaptable for use in containers subjected to comparatively rough treatment as would be the case in containers used to serve milk or other liquids to travelers, campers, and the like.

I am aware of the fact that ordinary milk bottles have cap receiving ledges upon their inner walls, but it will be observed that the cap receiving ledge in the case of my invention is disposed much further below the upper edge of the container than is the case with the ledges of milk bottles.

The purpose of this arrangement is to dispose this ledge so far below the drinking edge of the container that the ledge will not interfere with the use of the container as a receptacle from which one may drink the contents. Not only is this ledge disposed far enough below the upper edge to prevent actual contact of the lip of the user with said ledge, but it is disposed far enough below such upper edge to prevent the eddy currents, set up as the liquid flows over the ledge, from interfering with the user's act of drinking.

It is apparent that if the liquid were permitted to flow over a ledge at just about the point where the lips of the user contacted with the receptacle, there would be danger of bubbles of air being entrapped in the liquid and drawn into the mouth with consequent choking upon the part of the user. To prevent this and to insure a free and even flow of the liquid at the point where it is being drawn into the mouth, I find it advantageous to locate the ledge not less than one-half of an inch below the upper edge of the container and preferably from an inch to one and one-half inches below said edge. However, it is to be distinctly understood that I am not limited to the specific dimensions stated so long as the ledge is located at such point as to yield the advantages recited in the claims.

As before stated, the receptacle may be caused to serve as an ordinary drinking glass after its original contents have been consumed, and for that reason these receptacles will be sought after by the public and especially by campers who will find the possession of a set of these non-breakable drinking receptacles to be of considerable advantage.

These advantages will include, not only the use of these receptacles as drinking receptacles but, by providing additional paper caps, campers may use them as containers for left over foodstuffs, preserves, pickles, soups, and the like, in which such contents will be protected from insects. If a non-transparent Beetleware receptacle be used, the contents will also be protected from the deleterious effects of light.

While I have illustrated the receptacle as having outwardly flaring walls adjacent its upper end, and while this shape tends to facilitate the free flow of the liquid over the ledge, I wish it to be understood that the invention includes within its purview containers having straight side walls, as long as the ledge is so disposed with respect to the upper edge as to bring about the unbroken flow of the liquid at the point where the lips of the user engage the receptacle.

Having described my invention, what I claim is:

1. A receptacle of the character described in the form of a drinking glass of materially greater height than diameter having the conventional, relatively thin, continuous and uniform upper edge and having an integral internal ledge formed therearound at a point materially nearer its top than its bottom but at a point not less than three quarters of an inch below the upper edge of said receptacle, and said receptacle comprising an open top body portion having its greatest diameter at its upper edge, a paper cap adapted to be pressed into engagement with said ledge and to rest upon said ledge and to effect a substantially fluid tight engagement with the walls of the receptacle and said ledge, the walls of the receptacle above said ledge presenting an unbroken surface whereby the liquid from the lower part of the receptacle will be caused to flow in a smooth and even manner over that portion of the walls of the receptacle which lies outwardly of said ledge.

2. A receptacle of the character described in the form of a drinking glass of materially greater height than diameter, having an integral internal ledge formed therearound at a point materially nearer its top than its bottom but at a point not less than three quarters of an inch below the upper edge of said receptacle, said receptacle comprising an open top body portion having its greatest diameter at its upper edge and outwardly flaring above said ledge, a paper cap adapted to be pressed into engagement with said ledge and to rest upon said ledge and effect a substantially fluid tight engagement with the walls of the receptacle and said ledge, the walls of the receptacle above said ledge presenting an unbroken surface and the spacing of the ledge at least three quarters of an inch below the upper edge of said receptacle permitting the liquid to resume its flow in a smooth and even manner over that portion of the walls of the receptacle which lies outwardly of said ledge and before reaching the lips of one drinking from said glass.

3. A receptacle of the character described in the form of a drinking glass of materially greater height than diameter, having the conventional, relatively thin, continuous and uniform upper edge and having an integral internal ledge formed therearound at a point much nearer its top than its bottom, said receptacle constituting an open top body, and a paper cap adapted to be pressed into engagement with said ledge and to rest upon said ledge and effect a fluid tight engagement with the walls of the receptacle and said ledge, the walls of the receptacle above said ledge presenting a smooth and unbroken surface, the width of said ledge being in such relation to the distance of said ledge below the upper edge of the receptacle that liquid flowing over said ledge upon tipping of the receptacle, will resume its flow in a smooth and even manner over that portion of the walls of the receptacle outwardly of said ledge before reaching the lips of one drinking from said glass.

JULIAN F. THOMPSON.